Oct. 13, 1959     A. N. SAHAGUN     2,908,376
VIBRATORY FEEDER
Filed Jan. 12, 1959
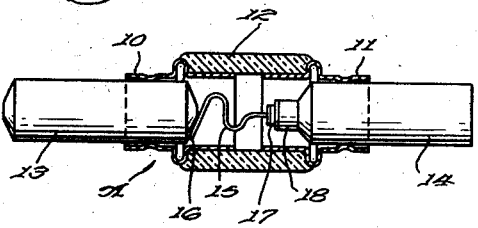
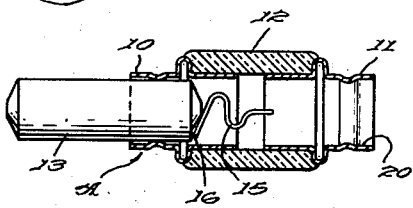
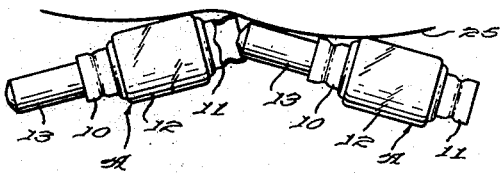
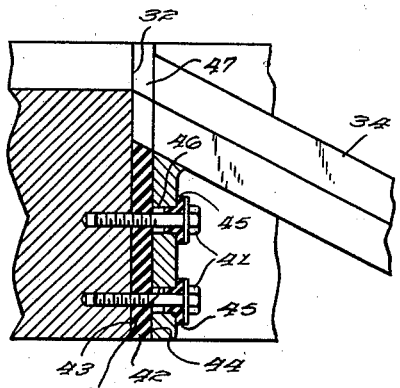
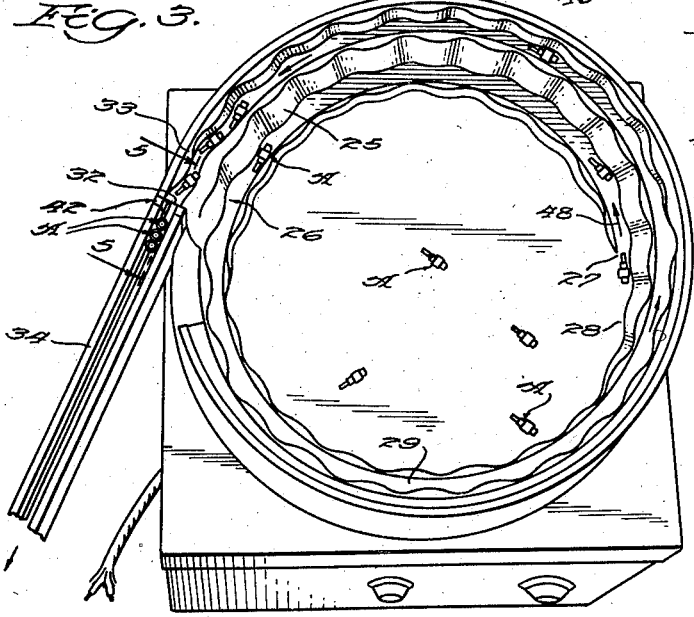
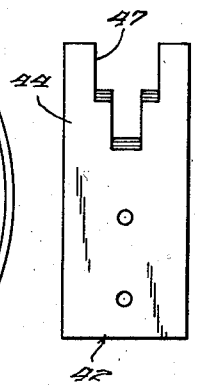
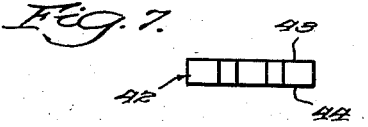
Inventor:
Armen N. Sahagun.
By Spensley and Horn
Attys.

United States Patent Office 2,908,376
Patented Oct. 13, 1959

2,908,376
VIBRATORY FEEDER

Armen N. Sahagun, Los Angeles, Calif., assignor to Pacific Semiconductors, Inc., Culver City, Calif., a corporation of Delaware Application January 12, 1959, Serial No. 786,074

9 Claims. (Cl. 198—33)

This invention relates to vibratory feeders and more particularly to a vibratory feeder having a bowl which includes a spiral conveying path permitting uninhibited movement of articles therealong, and to orienting means associated therewith.

Vibratory feeders for conveying a plurality of small articles in a predetermined orientation from a randomly arranged mass of such articles are well known. One such feeder is described in United States Patent No. 2,696,292 entitled "Spiral Conveyer Feeder Bowl" by William V. Spurlin, issued December 7, 1954. Feeder bowls of the type described are particularly useful as conveyers and feeders in various manufacturing processes in the semiconductor industry, for example. Often times, during an intermediate step in production, articles or sub-assemblies are produced which are fed to one station from another in a predetermined orientation or alignment by use of spiral conveyer feeder bowls. Where the articles or sub-assemblies include non-symmetrical components and more particularly when one end of the component defines an axial opening it may occur that the opposite end of the sub-assemblies will become telescoped within such opening. When this occurs, proper feeding and alignment by the feeder bowl is impossible as there may be produced an obstruction or jamming of the conveyer bowl or chute which receives the components at the exit from the bowl or elsewhere.

The prior art feeder bowls of the type herein described are typically made of cast iron. As these feeders are vibration controlled, small light weight articles, such as semiconductor component assemblies have a tendency to vibrate too greatly thus adversely affecting efficient feeding by the apparatus. It is therefore desirable, in such cases, to damp somewhat the vibration of the bowl.

Accordingly, it is an object of the present invention to provide a vibratory conveyer feeder bowl of improved construction which will preclude against the possibility of components or sub-assemblies being fed thereby from becoming telescoped.

Another object of the present invention is to provide a vibratory feeder bowl of the character herein described to feed small component sub-assemblies of a predetermined shape with insured freedom from jamming.

Yet another object of the present invention is to provide a vibratory feeder bowl of the character herein described to feed semiconductor diode package sub-assemblies which include an opening in one end thereof while precluding the possibility of their becoming telescoped together.

Still another object of the present invention is to provide a vibratory feeder of the character described which will feed a plurality of randomly oriented two-ended components in a predetermined orientation.

In accordance with the presently preferred embodiment of the invention, a vibratory spiral conveyer feeder bowl of the type well known to the art is modified by altering the shape of the conveyer path by zig-zagging the same in a manner as will hereinafter be more particularly described. In order to orient the sub-assemblies so that they exit from the bowl all oriented in the same direction, an inclined chute is fastened to the bowl exit. Between the bowl and the inclined chute there is placed a rubber strip in a manner hereinafter to be described. Further, the bowl, instead of being made of cast iron will either be rubber coated or made of aluminum.

The novel features which are believed to be characteristic of the invention, both as to its organization and method of operation, together with further objects and advantages thereof, will be better understood from the following description considered in connection with the accompanying drawing in which the presently preferred embodiment of the present invention is illustrated by way of example. It is to be expressly understood, however, that the drawing is for the purpose of illustration and description only, and is not intended as a definition of the limits of the invention.

In the drawing:

Figure 1 is a view in section of a semiconductor diode package assembly which is typical of the articles which may be fed by the feeder of the present invention;

Figure 2 is a sectional view of a whisker sub-assembly prior to final assembly with a crystal sub-assembly before the final completion of the assembly shown in Figure 1;

Figure 3 is a perspective view looking downward upon a vibratory spiral conveyer feeder bowl constructed in accordance with the present invention;

Figure 4 is an enlarged view showing two of the sub-assemblies of Figure 2 as they are fed along the spiral path of the bowl of Figure 3;

Figure 5 is a view taken along line 5—5 of Figure 3;

Figure 6 is a partial front elevation of the insert fastened between the bowl and the inclined chute; and Figure 7 is a plan view of the insert shown in Figure 6.

Referring now to the drawing, there is shown in Figure 1 a semiconductor diode package assembly of a type well known to the art. For purposes of simplicity and clarity of explanation, this invention will be described with reference to a semiconductor package sub-assembly as the article to be fed. The semiconductor package assembly of Figure 1 consists of two metal sleeves 10 and 11 which are sealed to a central glass envelope 12. Inserted within each of the sleeves and welded thereto are two metal pins 13 and 14. Pin 13 together with its associated whisker 15 which is welded to pin 13 at 16 constitutes the whisker sub-assembly of the package. A crystal element 17 is soldered or otherwise joined to the pedestal 18 of the pin 14 to form the crystal sub-assembly of the package. The particular package herein shown is more fully described in United States Patent No. 2,815,479 entitled "Glass Sealed Semiconductor Rectifier," by William M. Lewis and Henry D. Frazier, issued December 3, 1957.

In the manufacture of the package of Figure 1 as an intermediate step there is formed a so-called whisker sub-assembly as shown in Figure 2. The sub-assembly of Figure 2 which includes the body sub-assembly consisting of sleeves 10 and 11 and glass cylinder 12 together with the whisker assembly consisting of pin 13 and whisker 15 will typically be transported and aligned by means of a vibratory spiral conveyer feeder bowl of the type well known to the art.

This sub-assembly thus includes a projection consisting of pin 13 at one end thereof and defines an opening within sleeve 11 at the other end thereof. The present art vibratory feeder bowls include a spiral path for conveying the components such as the sub-assembly in Figure 2. Due to the fact that prior to final assembly there is a hole or opening 20 defined by the opening of the sleeve 11, it has been found that when a plurality of these sub-assemblies are placed into the bowl of a present conveyer feeder that the pin 13 of adjacent sub-assemblies become telescoped within the holes 20 of the sub-assemblies thus jamming the feeder.

In order to eliminate the jamming of the feeder caused by telescoping of the articles being fed as has hereinabove been explained, the present invention utilizes a side wall 25 of a spiral track 26 which is formed in a continuous zig-zag shape. The track 26 begins at 27 (see Figure 3) but the wall 25 begins to form the spiral curve at 28 before the track actually begins to form. The slope of the floor 29 of the track as it spirals from entrance 27 to exit 32 is substantially constant. The generally spiral shape ends at a point just before exit 32 at point 33 thus defining a short straight section therebetween which is in line with the inclined guideway or chute 34 connected to the exit 32 of the bowl. Throughout the length of the spiral curve from the floor of the feeder bowl to the exit 32 the side wall 25 is zig-zagged or fluted as shown in Figures 3 and 4. That is, the side wall 25 is formed with a series of curvatures to each side of a mean line defining the spiral curve. The radius of the curvature is determined by the length of the articles such that no straight portion exists of sufficient length to allow alignment of two articles permitting them to possibly become telescoped. The angle of the zig-zag and its radius of curvature will depend upon the length of the articles being fed, the diameter of the track and the size of the opening in the article. Thus, the particular dimensions can easily be determined by one skilled in the art.

An inclined chute or guideway 34 of the type well known to the art is fastened to the bowl at the exit 32 by means of screws 41 as may best be seen in Figure 5. Holes 46 within the wall of the bowl are made larger than the outside diameter of the screws 41 in order to accommodate rubber bushings 45. To insure that each of the whisker sub-assemblies designated by the letter A are received with the pin end down, the rubber insert 42 is channel shaped to mate with the slope of the chute 34, as may best be seen in Figure 7. The channel 47 includes an opening with two coaxial sections, one below the other, the upper section being larger in width than the lower. Further, the width of the upper section is made greater than the largest outside diameter of the article being fed while the lower section's width is larger than the outside diameter of the projection but smaller than the largest outside diameter of the article. The back surface 43 of the insert is placed against the bowl while the opposite surface 44 faces the inclined chute 34. The rubber insert serves two primary purposes. Firstly, the channel or opening 47 defined by the surface 44 acts in co-operation with chute 34 to orient all of the sub-assemblies A with the pin end down as they pass from the exit 32 from the bowl into the chute 34. This will occur since the sub-assemblies A are statically unbalanced; that is, the pin end is far heavier than the open end, thus regardless of the initial orientation as the sub-assembly passes over the insert 42, the pin end will fall down into the channel 47 as the sub-assembly will pivot about the edge of the chute which will act as a fulcrum. Thereafter the sub-assembly will be fed, pin end down by chute 34. The outside diameter of the glass sleeve 12 of the sub-assembly A is larger than the lower opening in the chute 34 which is coincident in cross section with the opening 47 of the rubber insert 42. Thus, there is a pivoting of article A as it exits from the bowl resulting in the pin 13 falling into the downward position within the smaller lower part of the opening 47.

Secondly, in order to achieve an efficient feeding of the components down the chute 34, to the next station, the chute itself must be vibrated. This may, of course, be accomplished by the use of a vibratory motor separate from that connected to and disposed below the feeder bowl. By affixing the chute directly to the feeder bowl which is vibrated by its associated motor, the chute, due to its relatively large mass, tends to dampen the bowl vibration to such an extent that it no longer serves as an efficient feeder. By interspersing the rubber insert 42 between the chute and the bowl, a vibratory motion is imparted to the chute sufficient for proper feeding without unduly dampening the vibration of the bowl.

If the bowl is made of cast iron, as is presently the case, the parts being of relatively small mass tend to vibrate to too great an extent impeding the efficiency of the feeding operation. If the bowl is rubber coated or made of aluminum this problem is abrogated. Aluminum as the bowl material has the further advantage of reducing the size of the motor as it need now vibrate a smaller mass.

There has thus been described a new and improved vibratory feeder for feeding and orienting a plurality of articles in a predetermined orientation.

What is claimed is:

1. In an article handling feeder bowl for delivering a plurality of articles, said bowl being of the type including an upstanding annular wall and an inclined generally spiral shaped track extending upwardly from the bottom of said bowl, the improvement comparing a generally spiral shaped track, the walls of which are shaped approximately in a continuous zig-zag curve, with respect to its spiral axis in order to prevent jamming of articles in said track.

2. In an article handling feeder bowl for delivering a plurality of two-ended articles including a projection at one end thereof and an opening at the other end thereof said bowl being of the type including an upstanding annular wall and an inclined generally spiral shaped track extending upwardly from the bottom of said bowl, the improvement comprising providing a generally spiral shaped track, the walls of which are shaped in a continuous zig-zag curve with respect to its spiral axis, whereby the projection from said one end of one of said articles will not become telescoped within the opening at said other end of another of said articles.

3. In an article handling feeder bowl for delivering a plurality of two-ended articles including a projection at one end thereof and an opening at the other end thereof in a predetermined orientation, said bowl being of the type including an upstanding annular wall and an inclined generally spiral shaped track extending upwardly from the bottom of said bowl, the improvement comprising providing walls of said track shaped in a continuous zig-zag curve whereby the projection from said one end of one of said articles will not become telescoped within the opening at said other end of another of said articles.

4. An article handling feeder for delivering a plurality of two-ended articles which articles include a projection at one end thereof and an opening at the other end thereof, said feeder comprising: a feeder bowl having a bottom with an upstanding annular wall; means to support and effect a vibratory reciprocation of said bowl in an inclined arcuate path of movement; and an inclined conveyor track extending from the bottom of said bowl upwardly around said annular wall for feeding articles from the bowl when said bowl is vibrated, said wall of said track being curved in a continuous zig-zag over the entire length thereof.

5. An article handling feeder for delivering a plurality of two-ended articles, which articles include a projection at one end thereof and an opening at the other end thereof, said articles further including a central region whose outside diameter is larger than that of said projection, said feeder comprising: a feeder bowl having a bottom with an upstanding annular wall; means to support and effect a vibratory reciprocation of said bowl in an inclined arcuate path of movement; an inclined conveyor track extending from the bottom of said bowl upwardly around said annular wall for feeding articles from the bowl when said bowl is vibrating, said wall of said track being curved in a continuous zig-zag over the entire length thereof; an inclined chute fixedly secured to said bowl at the exit thereof; and a resilient insert fastened between said chute and said bowl.

6. In an article handling feeder bowl for delivering a plurality of two-ended articles including a projection at one end thereof and an opening at the other end thereof in a predetermined orientation, said bowl being of the type including an upstanding annular wall and an inclined generally spiral shaped track extending from the bottom of said bowl, the improvement comprising providing a coating on the floor and walls of said track with a resilient material and providing a continuous zig-zag curved shape to the walls of said track throughout the length thereof whereby the projection from said one end of said articles will not become telescoped within the opening at the other end of another of said articles.

7. In an article handling feeder bowl for delivering a plurality of articles, said bowl being of the type including an upstanding annular wall and an inclined generally spiral shaped track extending upwardly from the bottom of said bowl, the improvement comprising a generally spiral shaped track, the walls of which are shaped in a continuous zig-zag curve with respect to its spiral axis in order to prevent jamming of articles in said track, said wall and track further being coated with a resilient material.

8. An article handling feeder for delivering a plurality of two-ended articles, which articles include a projection at one end thereof and an opening at the other end thereof, said articles further including a central region whose outside diameter is larger than that of said projection, said feeder comprising: a feeder bowl having a bottom with an upstanding annular wall; means to support and effect a vibratory reciprocation of said bowl in an inclined arcuate path of movement; an inclined conveyor track extending from the bottom of said bowl upwardly around said annular wall for feeding articles from the bowl when said bowl is vibrating, said wall of said track being curved in a continuous zig-zag over the entire length thereof; an inclined chute fixedly secured to said bowl at the exit thereof; said chute defining a channel shaped opening over the length thereof, said opening including a first relatively wide section and a second section small in width with respect to said first section, said second section being below said first section and coaxial therewith, said first section being slightly larger than the outside diameter of said central region and said second section being slightly wider than the outside diameter of said projection, whereby as said articles exit from said bowl into said chute, said articles will all become oriented with said projection ends facing downward into said second section; and a resilient insert fastened between said chute and said bowl.

9. An article handling feeder for delivering a plurality of two-ended articles, which articles include a projection at one end thereof and an opening at the other end thereof, said articles further including a central region whose outside diameter is larger than that of said projection, said feeder comprising: a feeder bowl having a bottom with upstanding annular walls; means to support and effect a vibratory reciprocation of said bowl in an inclined arcuate path of movement; an inclined conveyor track extending from the bottom of said bowl upwardly around said annular walls for feeding articles from the bowl when said bowl is vibrating, said walls of said track being curved in a continuous zig-zag over the entire length thereof, the floor and walls of said track being covered with a resilient coating; an inclined chute fixedly secured to said bowl at the exit thereof, said chute defining a channel shaped opening over the length thereof, said opening including a first relatively wide section and a second section small in width with respect to said first section, said second section being below said first section and coaxial therewith, said first section being slightly wider than the outside diameter of said central region and said second section being slightly wider than the outside diameter of said projection, whereby as said articles exit from said bowl into said chute, said articles will all become oriented with projection ends facing downward into said second section; and a resilient insert fastened between said chute and said bowl.

References Cited in the file of this patent

UNITED STATES PATENTS 2,872,019    Owen _____ Feb. 3, 1959